United States Patent [19]

Wang

[11] Patent Number: 5,696,881
[45] Date of Patent: Dec. 9, 1997

[54] METHOD FOR USE IN A PROCESSING SYSTEM HAVING A NETWORK THAT GENERATES A NETWORK OUTPUT SIGNAL AS A POLYNOMIAL FUNCTION OF A PLURALITY OF NETWORK INPUT SIGNALS

[75] Inventor: Shay-Ping Thomas Wang, Tempe, Ariz.

[73] Assignee: Motorola, Inc., Schaumburg, Ill.

[21] Appl. No.: 76,324

[22] Filed: Jun. 14, 1993

[51] Int. Cl.[6] .................................................. G06F 15/18
[52] U.S. Cl. ................................................................ 395/22
[58] Field of Search ............................... 395/10, 70, 22, 395/51, 61, 900, 20, 23, 24, 17

[56] References Cited

U.S. PATENT DOCUMENTS

| 4,979,126 | 12/1990 | Pao et al. ............................... 395/24 |
| 5,058,034 | 10/1991 | Murphy et al. ......................... 395/23 |
| 5,073,867 | 12/1991 | Murphy et al. ......................... 395/27 |
| 5,077,677 | 12/1991 | Murphy et al. ......................... 395/61 |
| 5,103,405 | 4/1992 | Murphy et al. ......................... 395/61 |
| 5,153,439 | 10/1992 | Gozoni et al. .......................... 395/22 |
| 5,168,549 | 12/1992 | Takagi et al. ......................... 395/900 |
| 5,255,344 | 10/1993 | Takagi et al. .......................... 395/22 |
| 5,295,061 | 3/1994 | Katayama et al. ..................... 395/61 |
| 5,408,588 | 4/1995 | Ulug .......................................... 395/24 |
| 5,467,428 | 11/1995 | Ulug .......................................... 395/24 |

OTHER PUBLICATIONS

Basic Issues on Fuzzy Rules and their Application to Fuzzy Control by Didier Dubois and Henri Prade, IJCAI '91 Workshops, Sydney, Australia, Aug. 1991 Proceedings.

Polynomial Functions Can Be Realized by Finite Size Multilayer Feedforward Neural Networks by Naohiro Toda, Ken-ichi Funahashi and Shiro Usui, 1991 IEEE International Joint Conference on Neural Networks, vol. 1 of 3, Nov. 1991.

A Connectionist Production System with Approximate Matching Function by Katsuaki Sanou, Steve G. Romaniuk, and Lawrence O. Hall, Second IEEE International Conference on Fuzzy Systems, San Francisco, CA, Mar. 28–Apr. 1, 1993, vol. 1.

Lin et al, "Neural Network–Based Fuzzy Logic Control and Decision System", IEEE Transactions on Computers, vol. 40, No. 12, Dec. 1991.

Heimer et al, "Classification of Blood Volume Pulse Signals Using an Artificial Neural Network Bayesian Classifier", 12th Southern Biomed Eng Conference, Apr. 2–4 1993, pp. 87–89.

Akers et al, "Synthetic Neural Systems in VLSI", 1990 pp. 318–336.

Hayashi et al, "Neural Network Driven Fuzzy Reasoning Model", Proc 28th SICE Annual Conference Jul. 1989 pp. 1343–1346.

Graf et al, "A Reconfigurable CMOS Neural Network", 1990, 1990 IEEE Int'l Solid State Circuits Conference, pp. 144–145.

Baocheng et al, "A New Approach of Fuzzy Control by Using Neural Network", Proc. of the Intelligent Vehicles '92 Symposium, Jun. 29–Jul. 1, 1992, pp. 321–324.

Keller et al, "Fuzzy Logic Inference Neural Networks", SPIE vol. 1192 Intelligent Robots & Comp Vision VIII: Algorithms & Techniques, Dec. 1989, pp. 582–591.

*Primary Examiner*—Robert W. Downs
*Attorney, Agent, or Firm*—Walter W. Nielsen; Michael K. Lindsey; Jeffrey G. Toler

[57] ABSTRACT

A continuous logic system using a neural network is characterized by defining input and output variables that do not use a membership function, by employing production rules (IF/THEN rules) that relate the output variables to the input variables, and by using the neural network to compute or interpolate the outputs. The neural network first learns the given production rules and then produces the outputs in real time. The neural network is constructed of artificial neurons each having only one significant processing element in the form of a multiplier. The neural network utilizes a training algorithm which does not require repetitive training and which yields a global minimum to each given set of input vectors.

7 Claims, 4 Drawing Sheets

$x_1$

|   | NL | NS | ZO | PS | PL |
|---|----|----|----|----|----|
| NL | PL | PL | PL | PS | ZO |
| NS | PL | PL | PS | ZO | NS |
| ZO | PL | PS | ZO | NS | NL |
| PS | PS | ZO | NS | NL | NL |
| PL | ZO | NS | NL | NL | NL |

$x_2$ labels the rows.

$x_1$

|   | NL | NS | ZO | PS | PL |
|---|------|------|------|-----|-----|
| NL | 1000 | 1000 | 1000 | 750 | 500 |
| NS | 1000 | 1000 | 750  | 500 | 250 |
| ZO | 1000 | 750  | 500  | 250 | 0   |
| PS | 750  | 500  | 250  | 0   | 0   |
| PL | 500  | 250  | 0    | 0   | 0   |

$x_2$ labels the rows.

1

METHOD FOR USE IN A PROCESSING SYSTEM HAVING A NETWORK THAT GENERATES A NETWORK OUTPUT SIGNAL AS A POLYNOMIAL FUNCTION OF A PLURALITY OF NETWORK INPUT SIGNALS

RELATED INVENTIONS

The present invention is related to the following inventions which are assigned to the same assignee as the present invention:

(1) "Artificial Neuron and Method of Using Same", having Ser. No. 08/076,602, now U.S. Pat. No. 5,390,136 issued Feb. 14, 1995;

(2) "Neural Network and Method of Using Same", having Ser. No. 08/076,601, now U.S. Pat. No. 5,517,667 issued May 14, 1996.

The subject matter of the above-identified related inventions is hereby incorporated by reference into the disclosure of this invention.

TECHNICAL FIELD

This invention relates generally to continuous logic systems and, in particular, to a continuous logic system in which the input and output variables do not employ a membership function, and in which the production rules are represented by examples. A neural network first learns the given production rules and then produces the defuzzified outputs in real time. The neural network utilizes a training algorithm which does not require repetitive training and which yields a global minimum to each given set of input variables.

BACKGROUND OF THE INVENTION

In recent years fuzzy logic control systems have been widely adapted in consumer electronics and appliances, process control, and speech recognition applications. For instance, fuzzy logic has been used in more than 2000 products in Japan alone. The popularity of fuzzy logic is due to its capability of controlling non-linear/uncertain systems which are difficult to control by conventional control algorithms.

Conventional fuzzy logic control systems are well known in the prior art, as shown for example in the article "A Comparison of Neural Network and Fuzzy Logic Control Systems", David J. Holloway et al., Proceedings of American Control Conference, 1992, pp. 2291–2294.

As discussed in the above-referenced article, fuzzy logic systems may be characterized by the definition of the input/output sets. By this, we mean that the input set will have an associated membership function or curve, which curve may overlap the neighboring sets of inputs. This is the defining difference between fuzzy sets and conventional set theory. There are potentially many problems associated with defining the membership function—for example, in selecting a curve of suitable shape (e.g. bell-shaped, trapezoidal, triangular, etc.) and breadth, and in overlapping of the curve with adjacent sets. These problems make tuning the logic system difficult and time-consuming, and they represent fundamental disadvantages of fuzzy logic control systems.

To be useful, the desired system outputs must be related to the system inputs in a certain way. This relationship is described by what are called "production rules" or "fuzzy associated memory rules". For example, in a room temperature control application, the input is the room temperature, the desired output is the thermostat setting, and the production rule is "if the room temperature is too high, turn the thermostat setting down".

Finally, a "defuzzification" process is employed to produce the desired outputs. The fuzzy logic computation occurs mainly in the defuzzification operation, which must first determine the proper membership values for given inputs, then determine which production rules are fired (i.e. selected). Next the selected production rules are combined together to produce an overlapped output membership function. Next the output is produced by determining the centroid (i.e. center of gravity) of the overlapped output membership functions.

Defuzzification is computationally very intensive, which prohibits the use of fuzzy logic systems in many complex applications—for example, where there are many production rules or large numbers of inputs and/or outputs.

FIG. 1 shows a conceptual diagram illustrating traditional set theory as applied to a rule-based system.

In the example shown, an input value x' can fall within one of a given plurality of sets 1–3. It will be noted that the value of f(x') is 1 when x' lies within set 1, and the value of f(x') is 0 when x' lies outside of set 1—i.e. when x' is within sets 2 or 3.

It should also be noted that the value of f(x') will be 0 even if x' is barely outside set 1. There is no overlap between adjacent sets 1–3.

FIG. 2 shows a conceptual diagram illustrating known fuzzy logic theory as applied to several sets.

In this example, two different membership functions, $f_1(x')$ and $f_2(x')$, are shown. The membership function $f_1(x')$ is represented by curve 4, while membership function $f_2(x')$ is represented by curve 5. It will be noted that curve 4 not only applies to values of x' within a given range or set 1, but it also extends to neighboring sets 7 and 8. In the example, membership function $f_2(x')$ also applies to sets 1 and 8.

For the same value of x' there could be multiple membership functions, as shown for example by the two different values of $f_1(x')$ and $f_2(x')$ at line 6. The use of multiple membership functions is not intuitive and may be quite confusing to many practitioners in this art.

The membership functions, shown in this example by curves 4 and 5, can assume many different forms, such as triangular, trapezoidal, rectangular, and so on. In existing fuzzy logic systems, each set has a membership function which is overlapped with a neighboring set.

In existing fuzzy logic systems, the inputs and outputs are related by the production rules, which are IF/THEN rules based on the designer's knowledge of the system to be controlled.

Existing fuzzy logic systems have several significant disadvantages. First, tuning such systems is very time-consuming. Before implementing a fuzzy logic system, the system designer must carefully tune the system. This includes selecting the proper input/output membership functions (e.g. triangular or trapezoidal), the degree of overlapping of the membership functions, and the number of production rules. The tuning process, which is based upon trial- and-error techniques and rule of thumb, is very time-consuming.

Secondly, existing fuzzy logic systems are computationally intensive. The fuzzy logic computation mainly occurs during the defuzzification operation, which must first determine the proper membership value for given inputs, and then compute the centroids of overlapped output membership functions to produce the output. Because the defuzzification operation is computationally very intensive, the utilization of existing fuzzy logic systems is prohibited in many applications (e.g. where there are many production rules or large numbers of inputs/outputs).

In summary, the drawbacks of existing fuzzy logic systems (e.g. deficiencies associated with tuning the system, excessive computational time, etc.) severely limit the acceptance and proliferation of fuzzy logic systems in many potential areas of utility, namely, manufacturing (statistical process control, routing), process control (adaptive control), CAD/CAM (optimization), robotics (coordinate transformation, adaptive control), image processing (smoothing, feature extraction), signal processing (noise cancellation, echo suppression), and so forth.

Therefore, there is a significant need to provide a logic control system that is easy to tune, that is easily scalable, that can be applied to large, complex problems, and that performs computations by parallel processing.

There is also a significant need for a logic control system which comprises a neural network which does not require repetitive training, which has a straight-forward architecture, and which yields a global minimum to each given set of input vectors.

SUMMARY OF THE INVENTION

The present invention has utility in a wide variety of computing environments, such as speech recognition, process control, optical character recognition, signal processing, image processing, telecommunications, and consumer electronics.

In the present invention a continuous logic system using a neural network is characterized by defining input and output variables that do not use a membership function, by employing production rules (IF/THEN rules) that relate the output variables to the input variables, and by using the neural network to compute or interpolate the outputs. The neural network first learns the given production rules and then produces the outputs in real time.

In the continuous logic system of the present invention, the neural network, which learns the production rules for defuzzification, produces excellent interpolated output.

Thus it is an advantage of the present invention to provide a system, which make take the form of a neural network, for continuous logic computation which is extremely easy to tune.

It is also an advantage of the present invention to provide a system, which make take the form of a neural network for continuous logic computation which can control a large/complex system by massive parallel processing.

In one embodiment of the present invention there is provided a method for continuous logic computation comprising the steps of (a) defining a continuous logic system which comprises a plurality of inputs and outputs; (b) defining production rules which relate the outputs to the inputs in a certain manner; (c) expressing the production rules by an algorithm which may take the form of a polynomial equation or orthogonal function; and (d) computing at least one interpolated output from the algorithm by substituting at least one input into the polynomial equation or orthogonal function.

In another embodiment of the present invention there is provided a system for continuous logic computation comprising: (a) means for defining a continuous logic system which comprises a plurality of inputs and outputs; (b) means for defining production rules which relate the outputs to the inputs in a certain manner; (c) means for expressing the production rules by an algorithm which may take the form of a polynomial equation or orthogonal function; and (d) means for computing at least one interpolated output from the algorithm by substituting at least one input into the polynomial equation or orthogonal function.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 3:
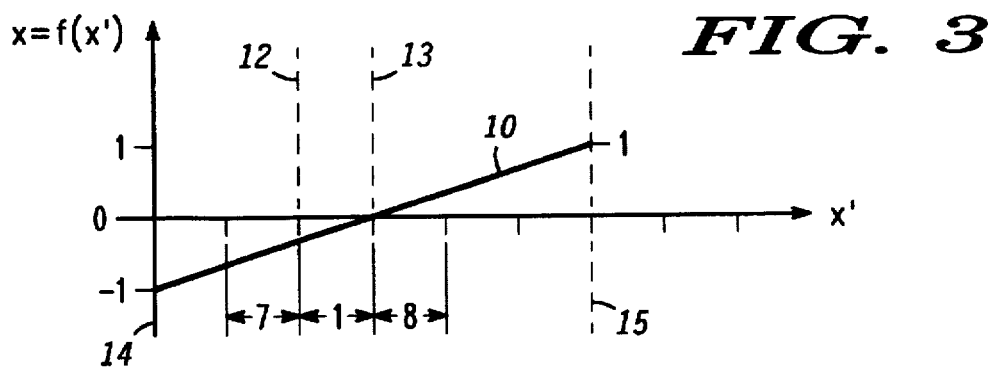
FIG. 3 shows a conceptual diagram illustrating continuous logic set theory as applied to several sets, in accordance with a preferred embodiment of the present invention.

FIG. 3 shows a conceptual diagram illustrating continuous logic theory as applied to several sets, in accordance with a preferred embodiment of the present invention. These sets are designated 1, 7, and 8 in FIG. 3.

Figure 1:
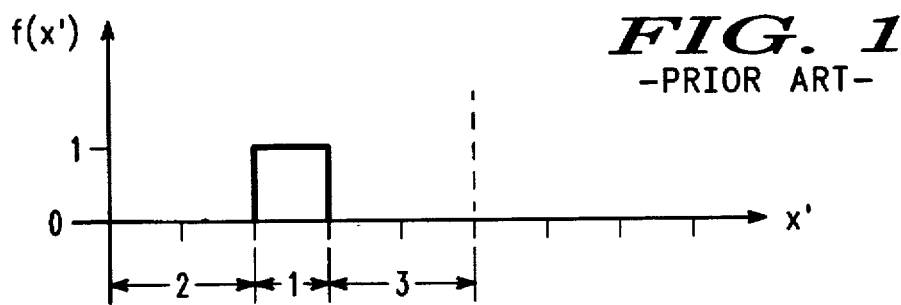
FIG. 1 shows a conceptual diagram illustrating traditional set theory as applied to a rule-based system.
Figure 2:
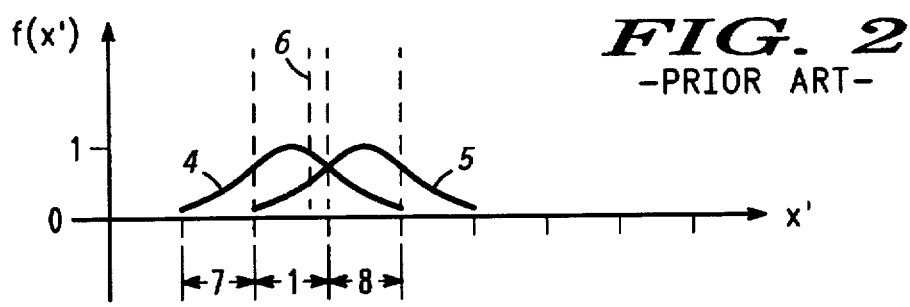
FIG. 2 shows a conceptual diagram illustrating known fuzzy logic set theory as applied to several sets.

It will be noted that the curve 10 representing f(x') covers the entire range of x', which extends from line 14 to line 15. Thus for any given value of x' there will be a function f(x') which characterizes the entire range of x'. This makes an understanding of the relationship between sets more intuitive than for either of the set theories described in FIGS. 1 and 2.

In the particular example shown in FIG. 3, the higher the value of x', the higher the value of f(x'), which is more easily comprehended by the practitioner in this field of technology. Of course, the function f(x') can be tuned for the particular application and may take the form of any suitable function.

Referring back to FIG. 1, it will be appreciated that conventional set theory is incapable of describing a continuous function for problems, because it is a binary (i.e. discontinuous) function.

Referring back to FIG. 2, fuzzy logic theory is not intuitively understood and is unclear conceptually, because the membership function overlaps neighboring sets. It is also difficult to manipulate so many membership functions for problem-solving. For example, for the same value of x' there may be two membership functions $f_1(x')$ and $f_2(x')$, as illustrated by curves 4 and 5 overlapping at line 6.

Regarding FIG. 3, the general process of transformation from x' to x in continuous logic (which=f(x')) may be referred as normalization, meaning the absolute value of x' is between 0 and 1.

Figure 4:
FIG. 4 shows a conceptual diagram of the normalization of an input value x' to a normalized value x having a value between −1 and +1.

FIG. 4 shows a conceptual diagram of the normalization of an input value x' to a normalized value x having a value between −1 and +1.

In a preferred embodiment the function f(x') is a straight line given by $$x = f(x') \qquad \text{Equation 1}$$

$$x = ax' + b \qquad \text{Equation 2}$$

wherein $|x| \leq 1$ in a preferred embodiment. It will be understood that $|x|$ may be greater than 1 in other implementations.

While in a preferred embodiment, the function f(x') is continuous, it will be understood that discontinuous functions may also be used.

Operation of Preferred Embodiment

In the present invention, the generation of outputs from inputs comprises two stages: (1) the stage of normalizing inputs as described with reference to FIG. 3, and (2) the stage of computing the interpolated outputs from the production rules.

This two-stage process will be explained below.

Normalization of Inputs

Figures 5, 6, 7:
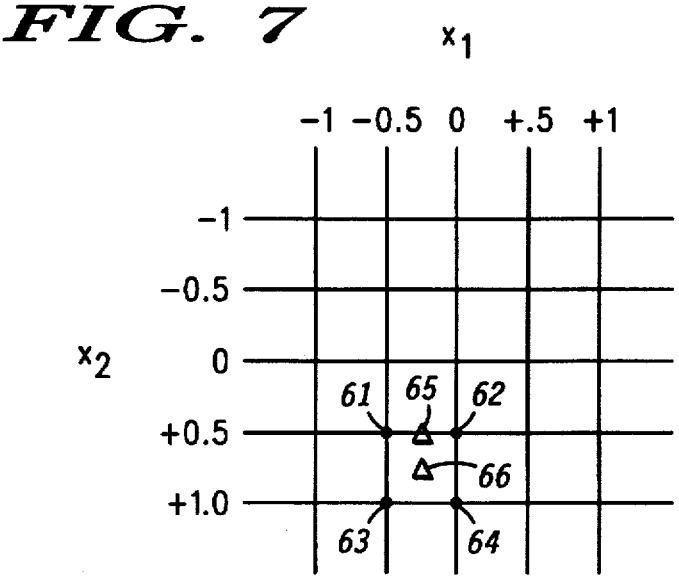
FIG. 5 shows production rules in table form for a temperature control problem performed by a neural network for continuous logic computation, in accordance with a preferred embodiment of the present invention.
FIG. 6 shows quantified values for the production rules of the table shown in FIG. 5.
FIG. 7 shows an example of interpolating the outputs from a neural network for continuous logic computation, in accordance with a preferred embodiment of the present invention.

FIG. 5 shows production rules in table form for a temperature control problem performed by a neural network for continuous logic computation, in accordance with a preferred embodiment of the present invention. This problem has two inputs and one output. For a given temperature X1 (as measured from a desired temperature setpoint), and a given humidity X2 (as measured from a desired humidity setpoint), the desired output response Y (fan speed) is illustrated by the table of FIG. 5.

In FIG. 5, NL represents a "negative large" value with respect to desired setpoint values of the variables X1 and X2; NS is a "negative small" value; ZO is a zero value; PS is a "positive small" value; and PL is a "positive large" value.

This table represents twenty-five production rules. For example, with reference to the upper left-hand corner of FIG. 5 the corresponding production rule is:

$$\text{IF } X1 = \text{NL AND } X2 = \text{NL, THEN } Y = \text{PL} \qquad \text{Equation 3}$$

The production rules are derived from the practitioner's experience and/or knowledge about the problem to be solved. It will be understood that while it may be advantageous to utilize production rules to tackle a problem, it should be noted that production rules for an expert system are often very brittle or crisp (i.e. the output cannot be interpolated but must be either "on" or "off"). For a fuzzy logic system, production rules often must be very complicated in order to produce a smooth interpolated output.

FIG. 6 shows quantified values for the production rules of the table shown in FIG. 5. $X_1$ is a continuous function of $X_1'$.

For example, $X_1$ is $f(X_1')$, as shown in FIG. 3. The same holds true for the relationship between $X_2$ and $X_2'$, it being understood that different functions may apply to $X_1$ and $X_2$.

For $X_1$ and $X_2$ we choose values for PL, PS, ZO, NS, and NL between −1 and +1. In this application, we choose PL=+1.0; PS=+0.5; ZO=0; NS=−0.5; and NL=−1.0.

For Y we choose PL=1000; PS=750; ZO=500; NS=250; and NL=0. These values of Y, representing fan speed, are given in suitable units such as revolutions per minute (RPM's).

The twenty-five production rules in FIG. 6 are now quantified. For example, by substituting values of NL for X1 and X2, and by substituting PL for Y in Equation 3, we get:

$$\text{IF } X1 = -1 \text{ AND } X2 = -1, \text{ THEN } Y = 1000 \qquad \text{Equation 4}$$

Of course, these values may vary, depending upon the application.

Interpolation of Outputs

FIG. 7 shows an example of interpolating the outputs from a neural network for continuous logic computation, in accordance with a preferred embodiment of the present invention. In FIG. 7, each intersection, e.g. intersection 61, represents an example (i.e. an input/output set). As an illustration, one such example is given by $X_1 = -0.5$, $X_2 = +0.5$, $Y = 500$ in FIG. 6 (i.e. corresponding to where $X_1 = \text{NS}$ and $X_2 = \text{PS}$).

If the actual input values $X_1$ and $X_2$ are equal to the input values of one of the twenty-five examples, the output Y of the network will be identical or very close to the output in the example. For instance, if $X_1 = -0.5$ and $X_2 = +0.5$, then the network output Y will be identical or very close to 500.

If the input value for $X_1$ is midway between examples 61 and 62 (i.e. at point 65), the output Y of the network will be identical or very close to the average of the outputs corresponding to examples 61 and 62. For instance if $X_1 = -0.25$ and $X_2 = +0.5$, then the network output Y will be identical or very close to (500+250)/2=375.

Likewise, if the input values $X_1$ and $X_2$ are at the center of examples 61–64 (i.e. at point 66), the output Y of the network will be identical or very close to the average of the outputs corresponding to examples 61–64. For instance if $X = -0.25$ and $X_2 = +0.75$, then the network output Y will be identical or very close to (500+250+250+0)/4=250.

This process is similar to the defuzzification of fuzzy logic control, which calculates the desired output value by using more than one production rule.

Training the Neural Network

Training the network comprises two stages: (1) the stage of defining the number of neurons in the network to be less than or equal to the number of production rules; (2) the stage of computing the weights of the neural network, in the manner referred to in Related Invention No. 2.

After training has been completed, the network is ready for implementation.

Implementation of the Continuous Logic System

In a preferred embodiment, there are two stages for computing or interpolating the outputs: (1) the stage of normalizing the inputs; and (2) the stage of generating the outputs by providing the normalized inputs to the network. For details concerning the computation of outputs, refer to the disclosure relating to same in Related Invention No. 2.

Preferred Embodiment of Neural Network

Figure 8:
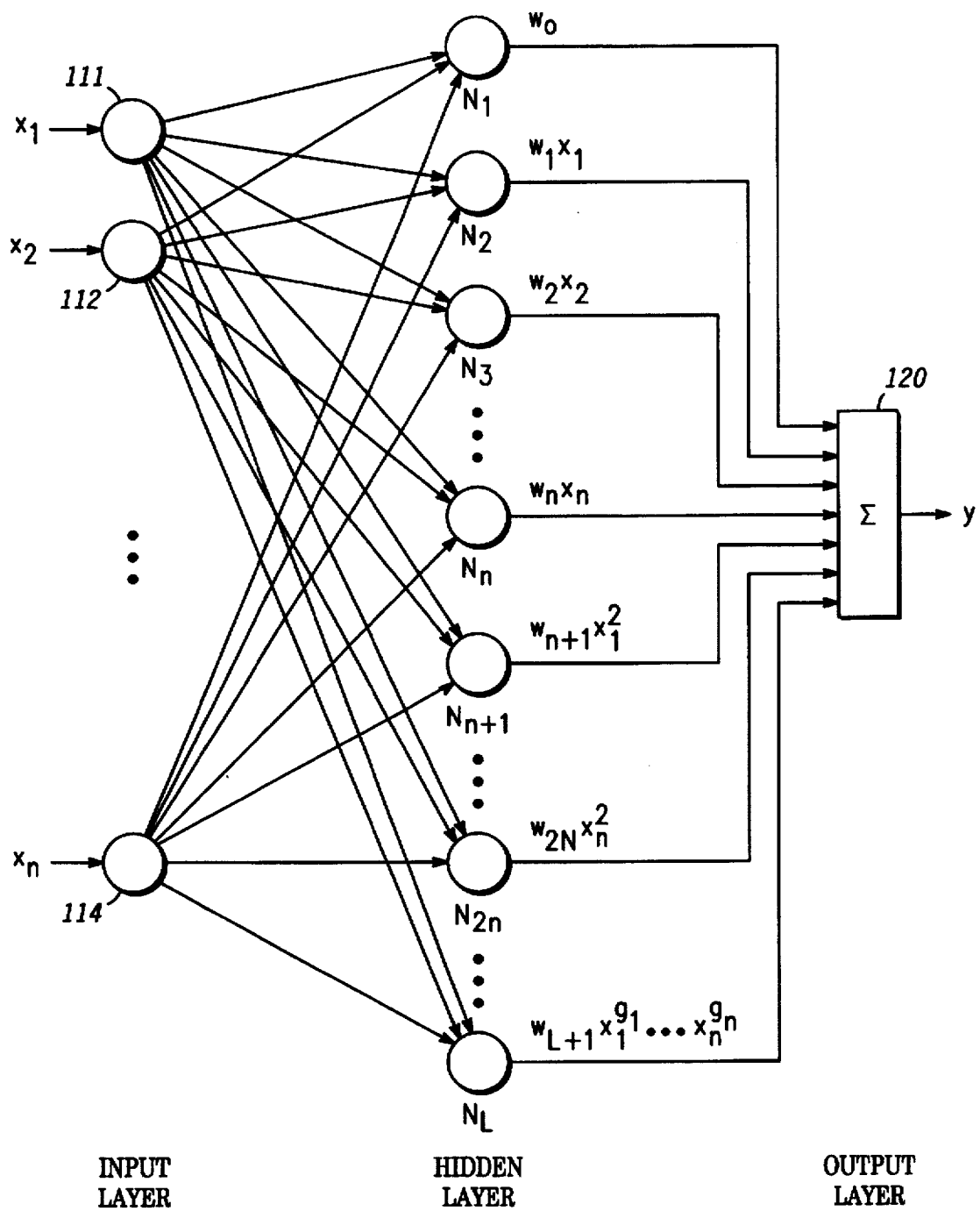
FIG. 8 shows a conceptual diagram of a neural network for continuous logic computation, in accordance with a preferred embodiment of the invention.

FIG. 8 shows a conceptual diagram of a neural network for continuous logic computation in accordance with a preferred embodiment of the invention. A plurality of inputs $x_1, x_2, \ldots, x_n$ are fed to input nodes 111, 112, ..., 114 of the input layer.

The output of each input node 111, 112, and 114 in the input layer is coupled to each neuron circuit of the "hidden layer" (of which only neuron circuits $N_1, N_2, N_3, N_n, N_{n+1}, N_{2n},$ and $N_L$ are shown). For example, the output of input node 111 is coupled to each of neuron circuits $N_1, N_2, N_3, N_n, N_{n+1}, N_{2n},$ and $N_L$, and to all other neuron circuits (not shown) in the "hidden layer".

The same connections are made regarding the outputs of input nodes 112, 114, and all other input nodes (not shown) in the "input layer".

For this embodiment of the neural network the outputs of neuron circuits $N_1, N_2, N_3, N_n, N_{n+1}, N_{2n},$ and $N_L$ are summed by summing circuit 120 to produce a network output y.

As described in Related Invention No. 2, the gated inputs are first produced by the neuron circuit and then multiplied by the multiplier of the neuron circuit to produce the neuron outputs.

The operation of the neural network of the present invention is based upon the use of a polynomial expansion and, in a loose sense, the use of an orthogonal function, such as sine, cosine, exponential/logarithmic, Fourier transformation, Legendre polynomial, radial basis function, or the like, or a combination of polynomial expansion and orthogonal functions.

A preferred embodiment employs a polynomial expansion of which the general case is represented by Equation 5 as follows:

$$y = \sum_{i=1}^{\infty} w_{i-1} x_{1 g_{1i}} x_{2 g_{2i}} \ldots x_n g_{ni} \qquad \text{Equation 5}$$

wherein $x_i$ represent the network inputs and can be a function such as $x_i = f_i(zj)$, wherein $z_j$ is any arbitrary variable, and wherein the indices i and j may be any positive integers; wherein y represents the output of the neural network; wherein $w_{i-1}$ represent the weight for the ith neuron; wherein $g_{1i}, \ldots, g_{ni}$ represent gating functions for the ith neuron and are integers, being 0 or greater in a preferred embodiment; and n is the number of network inputs.

Each term of Equation 5 expresses a neuron output and the weight and gating functions associated with such neuron. The number of terms of the polynomial expansion to be used in a neural network is based upon a number of factors, including the number of available neurons, the number of training examples, etc. Equation 5 may be expressed alternatively, as disclosed in Related Invention No. 2.

Each term of Equation 5 is produced by the output of a neuron or neuron circuit. With regard to FIG. 8, for example, neuron circuit $N_1$ produces the term $w_0$. Neuron circuit $N_2$ produces the term $w_1 x_1$. And so on.

In using a preferred embodiment of the present invention, the number of neuron circuits of the neural network is selected to be equal or less than the number of examples presented to the network. An example is defined as one set of given inputs and resulting outputs.

For the neural network to be useful, the weight of each neuron circuit must be determined. This can be accomplished by the use of an appropriate training algorithm, as described in Related Invention No. 2.

Figure 9:
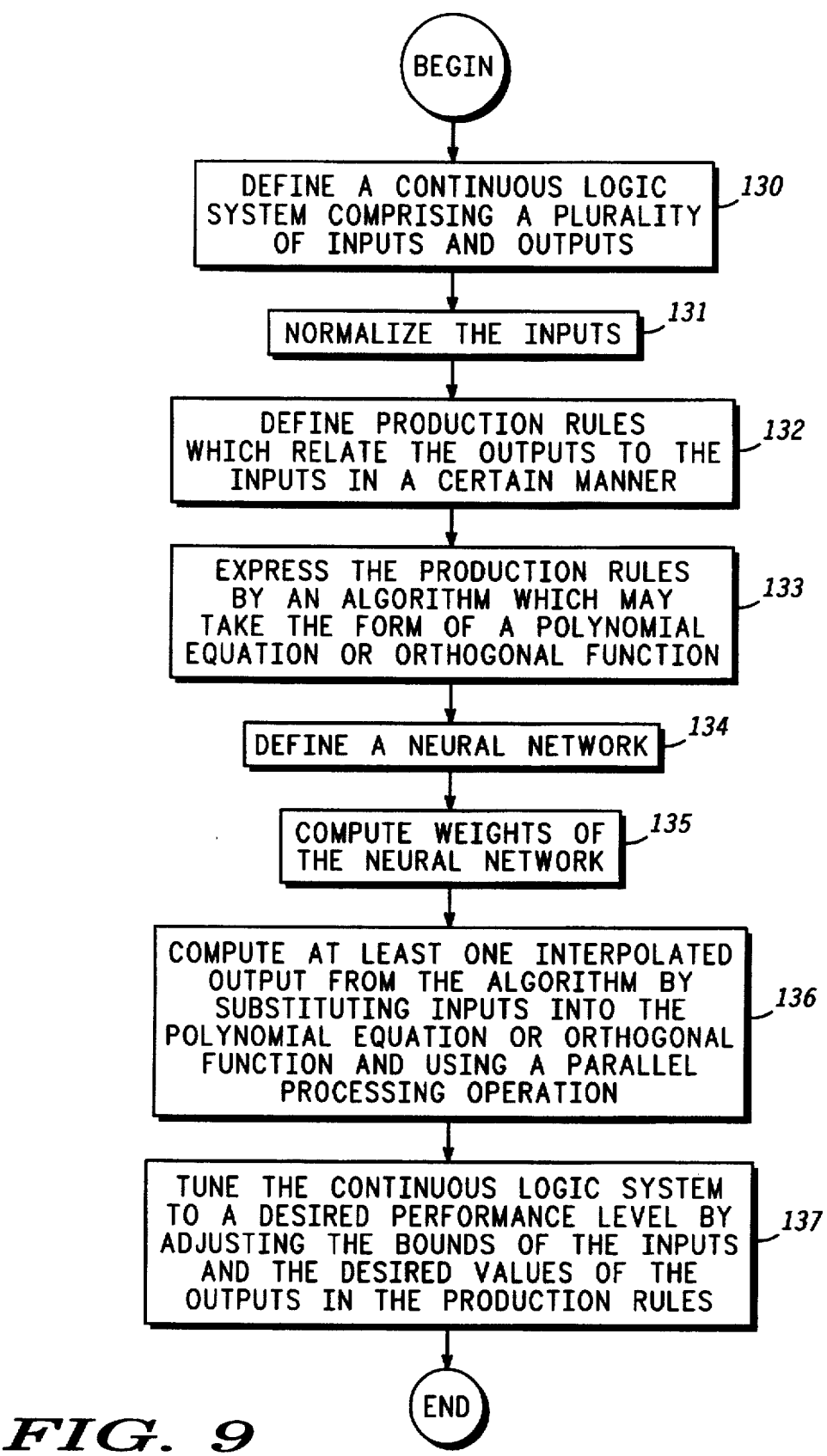
FIG. 9 shows a flow diagram of a method for continuous logic computation, in accordance with a preferred embodiment of the invention.

FIG. 9 shows a flow diagram of a method for continuous logic computation, in accordance with a preferred embodiment of the invention. As illustrated in box 130, a continuous logic system is defined which comprises a plurality of inputs and outputs.

Next, as illustrated in box 131, the inputs are normalized.

Next, as illustrated in box 132, the production rules are expressed which relate the system outputs to the system inputs in a certain manner.

As illustrated in box 133, the production rules may be expressed by an algorithm which may take the form of an expanded polynomial equation or, more generally, an orthogonal function.

As illustrated in box 134, the continuous logic system may be implemented in the form of a neural network which is defined by a plurality of neuron circuits, a plurality of network inputs, and a plurality of network outputs.

Next, as illustrated in box 135, the weights are computed for the neural network, if one is used to implement the method.

Next, as illustrated in box 136, at least one interpolated output is computed from the algorithm by substituting inputs into the polynomial equation or orthogonal function. This is preferably done using a parallel processing operation such as is inherently performed by a neural network.

Finally, as illustrated in box 137, the continuous logic system may be tuned to a desired performance level by adjusting bounds of the inputs and the desired values of the outputs in the production rules. This step may be performed, repeatedly if necessary, after observing the performance of the continuous logic system.

Summary

Thus there has been described herein a concept, as well as a preferred embodiment, of a system, which may be implemented as a neural network, for example on a semiconductor chip or as a computer program, for continuous logic computation which is extremely easy to tune, because it normally has only one variable to tune.

Additionally, the system for continuous logic computation can control a large/complex system by massive parallel processing in a relatively fast, efficient manner.

Furthermore, an implementation of a system for continuous logic computation, which utilizes a neural network as herein described, comprises a plurality of neurons which do not individually incorporate any non-linear function or summing function and each of which requires only a multiplier as its main processing element.

Because such neural network, and the methods of using same, as herein-described, do not require repetitive training and provide a global minimum to each given set of input vectors, they perform with vastly more accurate results, at a vastly improved reduction in computational time, and with a vast reduction in the cost and complexity of implementation, whether on a semiconductor chip or in a computer program.

It will be apparent to those skilled in the art that the disclosed invention may be modified in numerous ways and may assume many embodiments other than the preferred form specifically set out and described above.

For example, it is a matter of design choice regarding such system structural elements as the number of input nodes, number of neurons or neuron circuits, and the number of summing means or circuits and their interconnection, depending upon the integrated circuit technology, type of implementation (e.g. analog, digital, software, etc.), die sizes, pin-outs, and so on.

It will also be apparent that a truncated version of the above-mentioned polynomial expansion may be used as the basis of operation of the herein-described system for continuous logic computation, and that such truncated version may yield less precise although acceptable results, depending upon the intended use.

While FIG. 8 shows only one summing circuit in the output layer, it will be understood by one of ordinary skill that two or more summing circuits may be used if a particular continuous logic application requires multiple outputs.

Accordingly, it is intended by the appended claims to cover all modifications of the invention which fall within the true spirit and scope of the invention.

What is claimed is:

1. In a processing system having a network for generating a network output signal as a polynomial function of a plurality of network signal inputs, a method comprising the steps of:

(a) defining a continuous logic system which comprises a plurality of inputs and outputs;

(b) defining production rules which relate the outputs to the inputs in a certain manner;

(c) expressing the production rules by a nonlinear polynomial equation;

(d) configuring the network to implement the polynomial equation expressed in step (c);

(e) the network generating the network output signal based on the plurality of network signal inputs; and (f) generating at least one interpolated output based upon the network output signal.

2. The method of claim 1, further comprising the step of normalizing the inputs.

3. The method of claim 2, wherein said normalization step is performed by transforming the inputs into values between $-1$ and $+1$.

4. The method of claim 2, wherein said normalization step is performed by transforming the inputs into absolute values between 0 and 1.

5. The method of claim 1, wherein in step (f) said at least one interpolated output is computed by the network using a parallel processing operation.

6. The method of claim 1 further comprising the step of tuning the processing system to a desired performance level after the production rules have been expressed by the polynomial equation.

7. The method of claim 6, wherein said continuous logic system is tuned by adjusting the bounds of the inputs and the desired values of the outputs in the production rules.

* * * * *